Aug. 4, 1964    R. D. BORGESON ETAL    3,143,042
ELECTRO-HYDRAULIC SERVOMOTOR
Filed Dec. 30, 1960    2 Sheets-Sheet 1

INVENTORS
ROGER D. BORGESON
ROBERT F. RASMUSSEN

BY *[signature]*

ATTORNEY

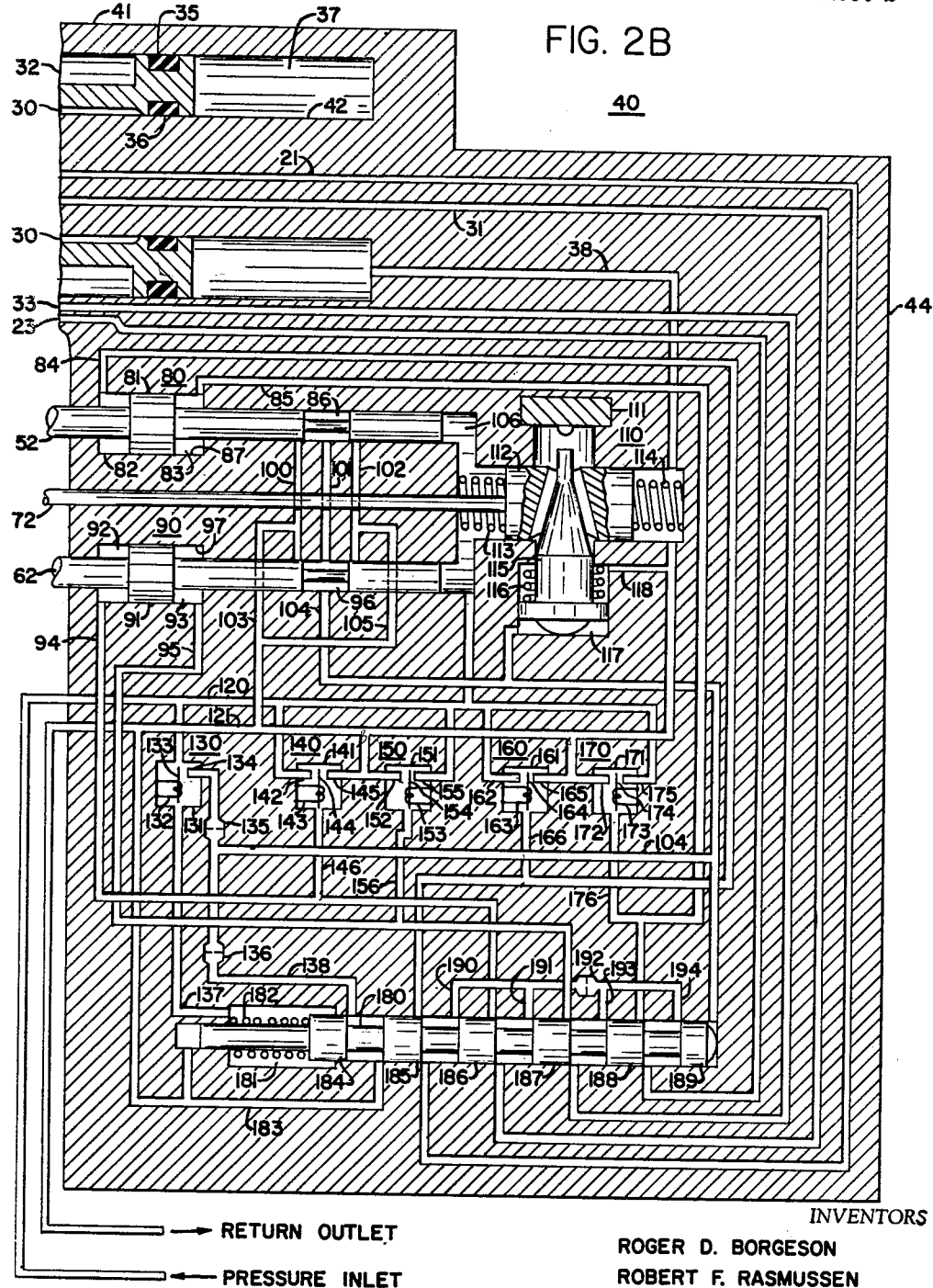

United States Patent Office 3,143,042
Patented Aug. 4, 1964

3,143,042
ELECTRO-HYDRAULIC SERVOMOTOR
Roger D. Borgeson, Fridley, and Robert F. Rasmussen, Brooklyn Center, Minn., assignors to Minneapolis-Honeywell Regulator Company, Minneapolis, Minn., a corporation of Delaware
Filed Dec. 30, 1960, Ser. No. 79,950
17 Claims. (Cl. 91—363)

Our invention relates generally to servomotor systems, and more particularly, to electro-hydraulic servomotor systems for aircraft.

In recent years, hydraulic control systems for aircraft have been developed which provide an extremely high mechanical advantage to both a pilot and an autopilot under in-flight operating conditions. Furthermore, aircraft have been developed that have such high performance characteristics that even a fairly small abrupt movement of an aerodynamic control surface can cause disastrous stresses of the aircraft. In such aircraft, it has become difficult for the pilot to manually control the aircraft and compensate for slight disturbances that occur, and it is necessary for the pilot to have the aid of an autopilot that automatically senses the required corrective movements.

This control problem has become so complex in some aircraft, that it has been found necessary to provide two or more independent autopilots in many applications in a monitoring configuration that permits one autopilot to detect a malfunction in the other autopilot and disengage the malfunctioning autopilot system before an abrupt control movement is attempted, in order to have the necessary fail-safe characteristics. Where systems of this type have been used, it has been the usual practice to use an electro-hydraulic servomotor that responds to a single electrical input, and to compare the individual autopilot signals electrically in some sort of a disengage or command-signal limiter, and use this limiter to provide the necessary control signal to the servomotor. However, in a system of this type, it is often necessary to use redundant electrical components to provide sufficient fail-safe characteristics in the limiter circuit itself, with the result that the overall system, including the redundant autopilots, the redundant circuitry of the limiters, and the servomotor, is complex and difficult to work with.

In the present invention, these problems are largely eliminated by providing an electro-hydraulic servomotor that compares and responds to, the signals from each of two independent autopilots, thereby eliminating the need for the separate disengage or command signal limiter circuit. In the event of a malfunction in either of the autopilots, or a malfunction in the hydraulic system, the servomotor immediately detects the malfunction and disengages the autopilots from the aerodynamic control surfaces of the aircraft. The disengagement of the autopilots is accomplished before the servomotor output shaft moves to the position commanded by the malfunction signal, therefore, the control surfaces are not subject to an abrupt movement upon a malfunction of any autopilot components. Furthermore, this disengagement is performed in such a manner that the control surface is gently moved to a neutral position, so that the overall system is prevented from introducing an abrupt control movement to the control surface upon disengagement thereof.

It is an object of this invention to provide an improved electro-hydraulic servomotor.

It is a further object of this invention to provide an improved electro-hydraulic servomotor which compares two independent electrical input signals and commands the actuator to respond to the average value of the two independent signals, and which is arranged to prevent the operation of the actuator upon malfunction of either of the systems providing the electrical input signals or of the hydraulic portion of the device.

A further object of our invention is to provide such an improved electro-hydraulic servomotor wherein, upon any of the aforementioned malfunctions, the actuator is gently restored to a neutral position.

These and other objects of our invention will become apparent from the following description of a preferred form thereof, and the two sheets of drawings illustrating that form, in which:

FIGURE 2B is a partial cross-sectional view of the servomotor.

Figure 1:
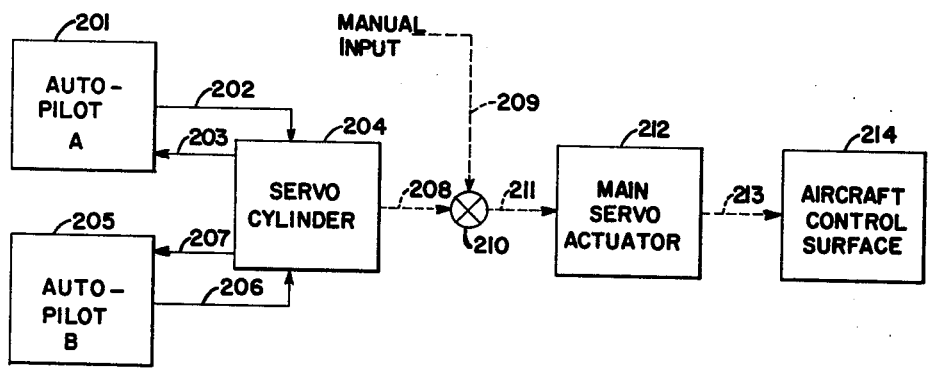
FIGURE 1 is a schematic diagram of a typical overall system in which the invention could be used.

In FIGURE 1, we have shown a system wherein two separate autopilots, 201 and 205, which will be referred to as autopilot channel A and autopilot channel B, respectively, are shown. Autopilot channel A, 201, provides an output over lead 202 that controls servo cylinder 204, and autopilot channel B, 205, controls said servo cylinder 204 by way of lead 206, and this is shown in greater detail in FIGURES 2A and 2B. Servo cylinder 204 provides a feedback signal to autopilot channel A over conductor 203, thereby forming a complete servo mechanism loop including elements 201, 202, 203, and 204. Servo cylinder 204 also provides a feedback signal over conductor 207 to autopilot channel B, thereby providing a complete servo mechanism loop including elements 204, 205, 206, and 207. It is servo cylinder 204 with its comparator means including feedback means 203 and 207 that forms the heart of the invention. Servo cylinder 204 provides an averaged mechanical output, which is indicated by dotted line 208, and this output is summed at summing point 210 with an input signal from the pilot manual control device, which is received over mechanical connector 209. The summing at point 210 may be a series connection, whereby control movements caused by servo cylinder 204 will not be felt in the manual control device, or it may be a parallel summing arrangement, in which case the control movements of 204 would be felt in the manual control device. In either case, there is a mechanical output from summing point 210 by way of connector 211 to the main servo actuator 212, this actuator being effective to convert the relatively low power mechanical input received over mechanical connection 211 into the necessarily high powered output that is required to control the aircraft aerodynamic control surfaces. The mechanical output of the main servo actuator 212 is thereby transmitted over mechanical connection 213 to the aircraft control surface 214 in the usual manner.

Figure 2A:
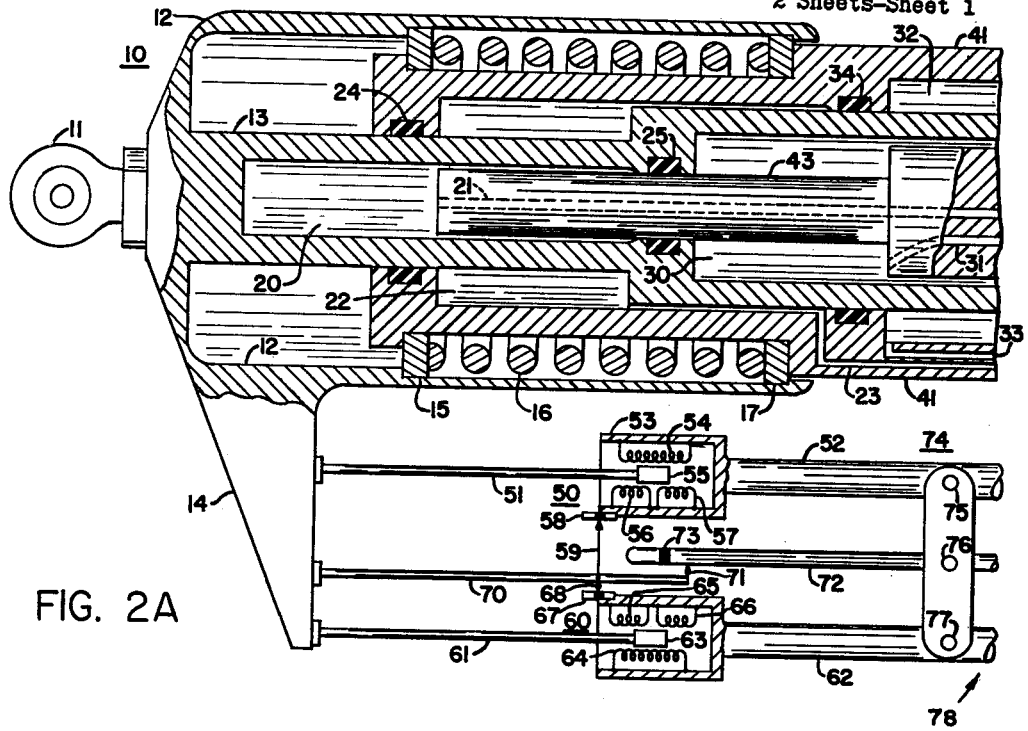
FIGURE 2A is a partial cross-sectional view of the servomotor.

In FIGURES 2A and 2B, we have shown the electro-hydraulic servomotor that constitutes the block shown as servo cylinder 204 in FIGURE 1. In this configuration, autopilot channel A controls relay valves 160 and 170, comparator cylinder 80, hydraulic chambers 20 and 22, and receives its feedback signal from circuit 50. Autopilot channel B controls relay valves 140 and 150, comparator cylinder 90, hydraulic chambers 30 and 32, and receives its feedback signal from circuit 60.

The general operation of the system is achieved by controlling the relay or control valves or control means such as 140 responsive to the autopilot signals, so as to permit the flow of fluid through valve chamber 141, into hydraulic passage 146, through a space between lands 186 and 187 of the engage valve 180 (when the spool is in the "engaged" or "operational" position), and through hydraulic passage 31 to chamber 30, and thereby cause actuator 10 to extend. This overall operation, and the details of the comparison capability of this system, will be better understood from a detailed description and complete analysis of the operation, which follows.

Detailed Description

In FIGURES 2A and 2B, output member or ram 10 includes a coupling 11, and is formed with an outer cylindrical portion 12 having a built-up portion at one side forming an arm 14, and an inner cylindrical portion 13 that is shaped to provide, in cooperation with base member 40, fluid or hydraulic chambers 20, 22, 30, 32, and 37. The smaller diameter section of portion 13 provides chambers 20 and 22 on the inside and outside, thereof, respectively. Chambers 20 and 22 in conjunction with output member 10 comprise a first output member portion. The larger diameter section of portion 13 provides chambers 30 and 32 on the inside and outside thereof, respectively. Chambers 30 and 32 in conjunction with output member 10 comprise a second output member portion. The end of cylindrical portion 13 cooperates with base member 40 to provide chamber 37.

Base 40 consists of a main body portion 44, an inner cylindrical shaft portion 42, and an outer cylindrical portion 41. The inner cylindrical shaft portion 42 extends axially along the line of movement of output member 10, and has a smaller diameter shaft 43 axially extending from the end thereof as shown. Outer cylindrical portion 41 has a larger diameter section located concentrically about shaft 42, and a smaller diameter section located concentrically about shaft 43.

With the output member 10 and base 40 assembled as shown, a number of hydraulic chambers are formed, including chamber 20 which is closed at one end by output member 10 and at the other end by O ring 25; chamber 22 which is sealed at one end by O ring 24 and at the other end by O ring 34; chamber 30 which is sealed at one end by O ring 25 and at the other end by O ring 36; chamber 32 which is sealed at one end by O ring 34 and at the other end by O ring 35; and annular chamber 37 which is sealed at one end O rings 35 and 36 and closed at the other end by base 40 and is connected by means of line 38 to return line 121. The four chambers 20, 22, 30 and 32 are pressure chambers, each having equal effective ram areas. The circular area at either end of chamber 20 is equal to the annular area at either end of chamber 22, which is equal to the annular area at either end of chamber 30, which is in turn equal to the annular area at either end of chamber 32. The proportions shown for the chambers are for illustration only and are not intended to result in the desired equal areas. Note that chamber 37 is not a pressure chamber for it is connected to the return line. Thus, if fluid under equal pressure is ported into each of the four chambers, there will be a net zero movement of the output member 10. As to the directional movement, it should be noted that base 40 is a fixed member, with the result that an increase in pressure in chambers 20 and 30 causes ram extension, whereas an increase in pressure in chambers 22 and 32 causes ram retraction.

In the absence of any hydraulic pressure or with equal pressure in all chambers in the system, it will be noted that ram 10 is maintained in a fixed position with respect to base 40 by coil spring 16 and spring retaining rings 15 and 17. Since the spring retaining rings 15 and 17 engage shoulders on the inner wall of outer cylindrical portion 12 of actuator 10, and shoulders on the outer surface of outer cylindrical portion 41 of base 40, ram 10 and base 40 are held in the relative positions as shown whenever there is an absence of hydraulic pressure or equal pressures in all chambers, and automatically return to this position whenever the pressure is removed. In the event that the fluid pressures in chambers 20 and 30 exceeds the fluid pressure in chambers 22 and 32, the ram 10 moves to the left and carries spring retaining ring 17 against spring 16 thereby compressing the spring against spring retaining ring 15. However, if the fluid pressures in chambers 22 and 32 exceeds the fluid pressures in chambers 20 and 30, the ram 10 moves to the right and spring retaining ring 15 then moves against spring 16 and compresses the spring against retaining ring 17, in an obvious manner.

It should be noted that each of the four pressure chambers described above is connected to engage valve spool 180 by an individual fluid passage or supply line, chamber 20 by passage 21, chamber 22 by passage 23, chamber 30 by passage 31, and chamber 32 by passage 33. These will be understood more clearly from the description to follow. It should be noted that ram 10 and base 40 are each shown as being of one-piece construction. It is apparent, however, that it would be impossible to assemble this device without making a number of individual pieces out of each main component, and it should be understood that the necessary steps are within the contemplation of the applicants.

The following component parts: the ram 10; the fluid chambers 20, 22, 30, 32, and 37, including that portion of base member 40 cooperating with ram 10 to form said fluid chambers, spring 16 and spring retaining rings 15 and 17; fluid passages or supply lines 21, 23, 31, 33, and 38; and the necessary supplies of fluid, will be referred to collectively as an actuator means. The use of the term actuator means hereafter will be understood to describe the combination of these components.

In the main body portion 44 of base 40, it will be noted that there is a comparator means 78 comprising a pair of comparator shaft means 80 and 90 connected by a whiffletree linkage 74. Also included in body 44 are a supply passage or pressure line 120; a return passage or return line 121; a disengage trim lockout assembly 110; a reset pilot valve 130; a pair of relay valves 140 and 150 normally controlled by one channel of the autopilot; a pair of relay valves 160 and 170 normally controlled by the other channel of the autopilot; three flow restricting orifices 135, 136 and 192; an engage valve spool 180; and numerous fluid passages or supply lines and ports to facilitate the necessary hydraulic connections. Each of these major components will now be briefly described.

Comparator shaft means 80 includes a rod 52 having a land, or piston, 81 formed concentrically thereon, and arranged to move longitudinally in cylindrical chamber 87. Piston 81 and chamber 87 cooperate to form chambers 82 and 83, which are connected to the rest of the system by passages 84 and 85 respectively. These components will be referred to collectively as a comparator shaft means 80 and the use of the term comparator shaft means 80 hereafter will be understood to describe the combination of these components.

Rod 52 is formed with a section of reduced diameter near the right end thereof, thereby forming an annular chamber 86. The rod 52 and chamber 86 cooperate with fluid passages 100, 101, and 102 to provide a first comparator disengage valve. This first comparator disengage valve will be described in greater detail below.

Comparator shaft means 90 is similar to comparator shaft means 80 and includes rod 62 having a land, or piston 91 formed concentrically thereon and arranged to move longitudinally in cylindrical chamber 97. Piston 91 and chamber 97 cooperate to form annular chambers 92 and 93, which are connected to the rest of the system by passages 94 and 95 respectively. These component parts of comparator shaft means 90 including rod 62, chamber 97, piston 91 and annular chambers 92 and 93 will be referred to collectively as comparator shaft means 90.

Rod 62 is formed with a section of reduced diameter near the right end thereof, thereby forming annular chamber 96. Rod 62 and chamber 96 cooperate with the above described fluid passages 100, 101, 102, to provide a second comparator disengage valve. This second comparator disengage valve will be described in greater detail below.

The disengage trim lockout assembly or switching means 110 includes a disengage switch 111; a piston 112 having a cone-shaped opening therein as shown; centering springs 113 and 114; mating piston element 115 having a switch operating extension at one end, a cone-shaped portion, and a circular shoulder at the other end; a disengage spring 116; a return line connection 118; and a chamber 117 connected to pressure line 104.

Reset pilot valve 130 comprises a "nozzle flapper" valve, including nozzle 134, flapper 133, and coil 132. These components are positioned within chamber 131 which is connected to supply passage or pressure line 120. The flapper 133 is normally positioned to close nozzle 134. Coil 132, when energized, moves flapper 133 away from nozzle 134, permitting flow therethrough. Although the electrical connections to coil 132 are not shown, it should be understood that this coil would ordinarily be connected to a source of voltage, and controlled by a pushbutton type switch at the pilot's location or, if desired, controlled automatically by the automatic control system. For purposes of the explanation here, it will be assumed that a pushbutton is used, and that upon release of the pushbutton, and a de-energization of coil 132, flapper 133 again blocks nozzle 134 to prevent flow through said nozzle. It should be noted that the pilot valve as shown in FIGURE 2B is a schematic representation of a "nozzle flapper" valve, however, any suitable valve may be used.

Relay or control valves or control means 140 and 150 are very similar to the reset pilot valve 130, except that each contains two nozzles and one flapper. Although the electrical connections are not shown, valves 140 and 150 are both controlled by one of the two autopilot channels, such as channel B, and one or the other of these valves is actuated depending on the direction of ram movement that is desired.

Relay or control valve 140 consists of a chamber 141 having a pair of nozzles 142 and 145 located therein, with an energizing coil 143 arranged to control a flapper 144, the flapper being normally positioned to close nozzle 142. It should be noted that nozzle 142 is connected to pressure line 120 and that nozzle 145 is connected to return line 121, so under normal circumstances, there is no pressure in chamber 141. When coil 143 is energized and valve 140 actuated, the flapper 144 moves away from nozzle 142 and against nozzle 145, thereby permitting flow of hydraulic fluid under pressure into chamber 141 and hence into lines 146 and 94.

Relay or control valve 150 is much the same as valve 140, and comprises a nozzle 152 connected to the return line 121, a nozzle 155 connected to the pressure line 120, and a coil 153 for controlling a flapper 154. The flapper is normally positioned to close nozzle 155. When coil 153 is energized and valve 150 actuated, the flapper 154 moves away from the nozzle 155 and against the nozzle 152, thereby permitting flow of hydraulic fluid under pressure into chamber 151 and hence into lines 156 and 95.

Relay or control valves or control means 160 and 170 are identical in structure and operation to the relay valves 140 and 150, except that they are controlled by autopilot channel A. Energization of coil 163 would control the flow of fluid into lines 166 and 84 and energization of coil 173 would control the flow of fluid into lines 176 and 85. Control valves 140, 150, 160, and 170 are schematically illustrated in FIGURE 2B as "nozzle flapper" valves. However, any suitable valve such as a time modulating valve or proportional valve may be utilized in place of valves 140 and 150 or in place of valves 160 and 170 to give an output indicative of the input signal when driven by the proper servo amplifier.

Engage valve spool 180 is mounted in a bore in base 40 as shown and is normally held in the position shown by spring 182. This spool includes a number of lands, including lands 184, 185, 186, 187, 188, and 189, and when pressure is received in line 104, the spool 180 moves to the left until the left end thereof abuts the end of the bore. With the spool 180 in the position shown, fluid passage 183 is connected to return passage or return line 121, fluid passages 21 and 31 are connected to ports 190 and 191, respectively, and fluid pressures 23 and 33 are connected to ports 194 and 193 respectively. The spool is held in the position shown by spring 182 and by means of the supply pressure in line 137 that exerts a pressure against the annular end area of land 184.

In addition to the hydraulically controlled components described above the invention includes: a pair of inductive feedback pick-offs 50 and 60; malfunction indication switches 58–59 and 67–68; and a self-test checkout sector switch 71–73. These components are all mounted as shown between comparator shafts 80 and 90 and arm 14 on output member 10. Although no electrical connections are shown, coils 54 and 64 are normally connected to a fixed alternating supply. The coils 56 and 57 provide a feedback signal to autopilot channel A, while coils 65 and 66 provide a feedback signal to autopilot channel B. Switch 58–59 includes a contact member 58 having a conducting member located between two insulating members, and an electrical circuit is completed with wiper 59 when the wiper engages said conducting section. Both the conducting section and wiper 59 being connected to an appropriate electrical circuit (not shown). Similarly, a circuit is completed with elements 67 and 68. In addition, an electrical circuit is completed by the sector switch 71–73 when wiper 71 contacts conducting strip 73 on arm 72, elements 71 and 73 being connected to an appropriate electrical circuit.

It should be understood that the pick-off assemblies or feedback means 50 and 60 are merely shown schematically and that in practice the pick-off assemblies would be constructed so as to generate a feedback signal at every possible position of the output member. While an inductive pick-off arrangement is shown, any suitable pick-off means, such as a potentiometer pick-off, may be used. When slug 55 is located as shown in pick-off assembly 50, each of the coils 56 and 57 receives an equal amount of flux from the energization of coil 54, and output signals of equal magnitude are produced. However, since coils 56 and 57 are connected in opposition, these signals cancel, so that there is a net zero output from the pick-off assembly 50. However, when there is relative longitudinal movement between slug 55 and coil 54, one or the other of the coils 56 and 57 produces a larger voltage. It is therefore apparent that a pick-off assembly has been shown whereby the magnitude and polarity of the output signal is determined by the extent and direction of the relative movement between the slug 55 and the input winding 54. Pick-off assembly 60 operates in a similar manner.

*Operation*

Prior to engagement, the servomotor is conditioned for operation by causing hydraulic fluid under pressure to flow through an inlet filter and into line 120. This hydraulic fluid is thereby directed to nozzles 142, 155, 162, and 175, but there is no flow through any of these nozzles since the respective flappers are positioned to prevent any fluid flow. Pressurized fluid is also carried into chamber 131 from line 120, but there is no flow through nozzle 134 due to the position of flapper 133 closing said nozzle. This pressurized fluid also flows into line 137, and chamber 181, but has no effect on the position of spool 180, other than to reinforce the effect of spring 182 in maintaining spool 180 in its position as shown. Fluid is also directed from line 120 into chamber 106 and exerts a force on the right end of rod 52 of comparator shaft means 80; on the right end of rod 62 of comparator shaft means 90; and on the left end of piston 112. The end areas of these three elements are chosen so as to balance these forces in opposite directions. That is to say, the force exerted on the right end of rod 52 and transmitted to pin 75 of whiffletree linkage 74 and the force exerted on the right end of rod 62 and transmitted to pin 77 of whiffletree linkage 74 equal the force exerted on the left end of piston 112 and transmitted to pin 76 of whiffletree linkage 74. Because of the geometry of the whiffletree linkage 74, it is clear that there will be substantially no relative movement of these components due to the introduction of fluid pressure in chamber 106. However, the pressurized fluid in chamber 106 does have the effect of tending to force the two rods 52 and 62 to the left, while tending to force rod 72 to the right, thereby eliminating any backlash that could be caused by "slop" between the pins 75, 76, and 77, and their respective shafts. The springs on the opposite ends of piston 112, namely 113 and 114, are still effective to center piston 112 over element 115.

At any time, during this disengaged condition, when there is no input to the servomotor from the autopilots, piston 112 should be centered over element 115; thereby holding pistons 81 and 91 in the position shown in the drawing. In that event, circuits should be completed between strip 58 and wiper 59, and between strip 67 and wiper 68, with an appropriate indication to the pilot by reason of a suitable indicator (not shown) that responds to these circuit closures.

It is possible to check out the autopilot during this disengaged condition, to determine whether a malfunction exists, and this is done by introducing a predetermined signal into each channel of the autopilot. For purposes of this discussion, and throughout the remainder of this specification, it will be presumed that autopilot channel A, which is identified as block 201 in FIGURE 1, controls relay or control valves 160 and 170 in the servo cylinder; and that autopilot channel B, indicated as block 205 in FIGURE 1, controls relay or control valves 140 and 150 in the servo cylinder. Therefore, when a signal of predetermined magnitude, and of a polarity that would ordinarily cause ram 10 to extend, is developed in each of the autopilot channels; coils 143 and 163 are energized. Flapper 144 is thereby moved away from nozzle 142 and against nozzle 145, and flapper 164 is thereby moved away from nozzle 162 and against nozzle 165. Hydraulic fluid is thereby directed into passages 146 and 166. The fluid in passage 146 is directed through passage 94 into chamber 92 and against the left face of piston 91, and is prevented from flowing through the spool 180 by land 186. Fluid in passage 166 flows through passage 84 into chamber 82 and against the left face of piston 81, and is prevented from flowing through the engage valve spool 180 by land 185.

If each of the autopilot channels responds in the intended manner to the predetermined signal, the signal from channel A causes piston 81 and hence rod 52 to move to the right, and the signal from autopilot channel B causes piston 91 and hence rod 62 to move to the right an equal amount. This causes rod 72, connected to rod 52 and 62 through whiffletree linkage 74, to move to the right such that wiper 71 will come in contact with conducting strip 73 on shaft 72, and a circuit will thereby be completed between wiper 71 and conducting strip 73. The connecting leads and circuit (not shown) of check out switch 71-73 are connected to a suitable indicating device (not shown) in the pilot's compartment, so that he is informed that a proper servo response was achieved by reason of the predetermined input signal. As rods 52 and 62 move to the right, they also move the coils of the feedback assemblies 50 and 60 with respect to their respective slugs 55 and 63. A feedback signal is thereby developed in coils 56 and 57 and is transmitted to the channel A autopilot, this function being shown schematically in FIGURE 1 by lead 203. A signal is also developed in coils 65 and 66 and is transmitted to autopilot channel B, which is indicated in FIGURE 1 by a lead 207.

When the feedback signal, which is of the opposite phase of the control signal in each autopilot bridge, achieves the magnitude of the control signal; for example, when the feedback signal on lead 203 achieves the magnitude of the initial predetermined control signal in autopilot channel A, the servo loop including autopilot channel A, lead 202, servo cylinder 204, and feedback lead 203, is balanced and there is zero error signal. Similarly, the loop including elements 205, 206, 207 and 204 will be satisfied.

After the predetermined signal is terminated, the valves 140 and 160 will revert to their normal unenergized condition. Flapper 144 will close nozzle 142 and flapper 164 will close nozzle 162. In addition, after the predetermined signal is terminated, or as mentioned previously, at any time when there is no input to the servomotor from the autopilot channels, piston 112 should be centered over element 115, thereby holding pistons 81 and 91 in the position shown in the drawing. In that event, circuits should be completed between strip 58 and wiper 59, and between strip 67 and wiper 68, with an appropriate indication to the pilot by reason of a suitable indicator (not shown) that responds to these circuit closures.

In the event that a malfunction does exist in either of the autopilot channels during this disengaged condition, such as for example, a condition that causes a hardover signal, calling for ram 10 to extend, to be continuously generated in channel A, valve 160 will be energized and fluid will flow through passages 166 and 84 to chamber 82 whereby piston 81 will be displaced to the right chamber 87 as viewed in FIGURE 2B. As piston 81 and rod 52 move to the right the whiffletree linkage 74 pivots clockwise about pin 77, because in the absence of any signal piston 91 and consequently pin 77 are held by the servo loop, in the null or central position as shown. Therefore, the conducting strip on element 58 is moved away from contact 59, causing a break in the circuit including elements 58 and 59. This would indicate to the pilot that a malfunction exists in channel A, and that the servomotor is not in a condition that would permit engagement thereof. A malfunction in channel B would react similarly.

In view of the above, it is apparent that both autopilot channels can be checked by means of the comparator arrangement to determine whether the autopilot is in suitable operating condition.

After a determination has been made that the system is functioning, which is indicated by the fact that the malfunction switches 58-59 and 67-68 are closed, there could be an automatic program for engaging the servomotor, or this can be done manually. In either case, reset pilot valve 130 is operated, coil 132 being energized to move flapper 133 away from nozzle 134, and fluid in line 120 is thereby directed through nozzle 134, restricting orifice 135, and into passage 104. As pressure builds up in passage 104, some of it is drained to the return line by way of full restricting orifice 136, passage 138, the space between lands 184 and 185, passage 183 and to return line 121. However, pressure builds up in passage 104 faster than restricting orifice 136 will permit it to be drained off, and the pressurized fluid in passage 104 is directed against the right face of land 189, thereby driving engage valve spool 180 to the left as viewed in FIGURE 2B. When engage valve spool reaches its leftward position, the right edge of land 184 has moved past the right edge of chamber 181, and fluid in passage 137 and chamber 181 is thereby directed into the space between lands 184 and 185, into passage 138 and through restricting orifice 136 to maintain the pressure in passage 104 and on the right face of land 189 and hold engage valve spool in the engage position, even though the signal is then removed from coil 132 of the reset pilot valve. With the engage valve spool 180 in the engage position, passage 183 connecting to return line 121 is blocked by land 185, preventing a direct connection of the pressure line to the return line through the space between lands 184 and 185.

At the same time that engage valve spool 180 is being moved to the left, fluid in passage 104 is directed into chamber 117 and against the bottom face of element 115, thereby compressing spring 116 and driving element 115 into its upward position as viewed in FIGURE 2B. The cone-shaped portion of element 115 then mates with the corresponding opening in piston 112, locking piston 112 in the center position shown. The extension at the upper end of element 115 makes mechanical contact with disengage switch 111, and an appropriate circuit (not shown) operated by this disengage switch is effective to notify the pilot that the servomotor has been engaged. Thus, as long as engage valve spool 180 is moved to the left, element 115 is in its upward position as viewed in FIGURE 2B, thereby locking piston 112 in the position shown. It should be noted that the fluid in passage 104 also flows into chambers 86 and 96 formed by the reduced areas in rods 52 and 62, respectively; the operative function associated with these chambers will be described hereinafter.

After the servomotor has been engaged and the reset pilot valve 130 has been de-energized, the engage valve spool 180 and the switching means or disengage trim lockout mechanism 110 are held in their engage positions by pressure in supply passages 120, 137, 138, and 104, and the servomotor is conditioned to move ram 10 responsive to an input signal from the autopilot. For example, in the event that autopilot channel A calls for a ram extending movement, coil 163 is energized so as to permit fluid from line 120 to flow through nozzle 162, passage 166, between lands 185 and 186 of engage valve spool 180, and passage 21 into chamber 20. When the pressure in chamber 20 exceeds the pressure in chamber 22 it has the effect of driving ram 10 to the left, or extending the ram. On the other hand, if autopilot channel A calls for a ram retracting movement, coil 173 is energized and fluid is directed from line 120 through nozzle 175, passage 176, between lands 188 and 189 of engage valve spool 180, and passage 23 into annular chamber 22. When the pressure in annular chamber 22 exceeds the pressure in chamber 20 it has the effect of driving ram 10 to the right, which is a retracting movement of the ram.

Similarly, if channel B of the autopilot calls for a ram extending movement, coil 143 of relay valve 140 is energized, and fluid from line 120 then flows through nozzle 142, passage 146, between lands 186 and 187, and passage 31 into annular chamber 30. When the pressure in chamber 30 exceeds the pressure in chamber 32 it causes a ram extending movement. If autopilot channel B calls for a ram retraction movement, coil 153 is energized, which causes fluid in line 120 to flow through nozzle 155, passage 156, between lands 187 and 188, and passage 33 into annular chamber 32. When the pressure in chamber 32 exceeds the pressure in chamber 30 it causes a ram retracting movement.

Using a specific example in which both autopilot channels supply a control signal, assume that equal signals are generated in each channel which call for one unit movement of ram 10 in the extend direction. Control valves, 140 and 160 are simultaneously energized, and thereby allow the flow of fluid into chambers 20 and 30 simultaneously. The pressure in chambers 20 and 30 exceeds the pressure in chambers 22 and 32. Consequently, ram 10 moves to the left until rod 51 carries slug 55 to a position where the feedback circuit 50 generates a signal that balances the channel A autopilot bridge circuit. Similarly, rod 61 carries slug 63 to the point where feedback circuit 60 generates an appropriate feedback signal balancing the channel B autopilot bridge circuit.

As the ram was being extended responsive to the control signals in the above example, pressure from lines 146 and 166 was also effective to pressurize chambers 92 and 82, respectively. Equal pressures were applied to each of the chambers 82 and 92 for the same period of time (since the autopilot channels were presumed to be operating synchronously) and pivot point 76 was fixed in space by the locking action of element 115 in piston 112. Therefore, whiffletree linkage 74 remains in the vertical position as shown, and there is no movement of either of pistons 81 and 91. It should be understood that the various relay or control valves, such as 140 and 160, may be on-off valves, or may be controlled by a pulse width or other time modulated control signals, but the important point is that when equal control signals are generated in both of the autopilot channels, the valves are operated for the same total length of time. That is, coils 143 and 163 are energized for the same period of time for an extend movement, and coils 153 and 173 are energized for the same period of time for a retract movement. It should be pointed out that the comparator means 78 serves no function where the signals from autopilot channel A and autopilot channel B are identical (i.e. equal in magnitude, phase, and duration).

In the event that unequal signals are generated by autopilot channel A and autopilot channel B, indicating a slight malfunction of one of the systems, or perhaps, a slight difference in the tolerance of the system, the relay or control valves of the respective channels are energized for different periods of time. For example, if we assume that autopilot channel A is generating a signal calling for a one unit movement of ram 10 in the extend direction, and that autopilot channel B is producing no signal; control valve 160 (coil 163) is energized and causes fluid to flow into chambers 82 and 20. The pressure in chamber 20 which exceeds the pressure in chamber 22 causes the ram to extend. The piston 81 responds to the flow rate of control valve 160 and is displaced to the right as viewed in FIGURE 2B. The whiffletree linkage 74 is thereby rotated in a clockwise direction (since pin 76 is fixed in position due to the interaction of piston 112 and element 115) and pulls piston 91 to the left. It is important to note that the comparator pistons 81 and 91 respond to the flow rate of the control valves. That is to say, the comparator pistons integrate the difference in the input signals and the rate of response of the comparator pistons is proportional to the difference in input signals from the autopilot channel A and autopilot channel B.

Although a one unit movement was called for by the channel A autopilot, when the ram is moved one-half unit to the left, piston 81 will have moved one-half to the right, and piston 91 will have moved one-half unit to the left. Thus, although slug 63 is moving to the left, and attempting to generate a feedback signal, rod 62 is also moving to the left synchronously with movement of slug 63, so that there is a net zero output from the channel B feedback circuit, thereby corresponding to the zero output of the autopilot channel. Thus, the channel B servo loop is satisfied by reason of the fact that there is no feedback generated. On the other hand, as slug 55 moves to the left one-half unit, rod 52 moves to the right an additional half unit, causing a net displacement between slug 50 and the feedback coils 56 and 57 of one unit, so that the one unit feedback signal that is necessary to balance the channel A servo loop is generated after one-half unit of ram movement. Thus, it is seen, that an averaging effect is achieved by the comparator means 78.

Similarly, if a signal calling for three units of movement in the extend direction is generated in channel B and a signal calling for two units of movement in the extend direction is generated in channel A, ram 10 will move 2½ units to the left, piston 81 will move ½ unit to the left, and piston 91 will move ½ unit to the right, causing a counter-clockwise movement of whiffletree linkage 74, and a net output from feedback circuit 50 corresponding to two units of movement in the extend direction, with a net output from feedback circuit 60 corresponding to three units of movement in the extend direction. The servo loops are thereby balanced, and the ram assumes an average position. A similar operation occurs for ram retract signals, as would be obvious to those skilled in the art.

In the event that a serious malfunction occurs in one of the autopilot bridges, the servomotor is automatically disengaged. A serious malfunction would cause a large differential in the input signals which in turn would cause a large difference in the flow rate in the respective control valves. Since the comparator pistons respond to the flow rate of the control valves, the pistons will be displaced accordingly and the whiffletree 74 will be rotated about pin 76. When the comparator pistons have been displaced a predetermined amount, the fluid will be directed by the comparator disengage valves so as to disengage the servomotor. It will be noted that since the comparator pistons perform an integrating function, the disengagement is not effective immediately upon a large differential in input signals, but only after this differential has existed for a definite amount of time. This prevents disengagement due to a sudden "blip" signal, since the integration function of the comparator pistons tends to smooth out the "blip" or difference in input signals.

This disengagement operation can be best explained by using another example, it will be assumed that channel A is now generating a signal tending to cause four units of ram movement, in the extend direction, whereas channel B is only generating a signal corresponding to two units of ram movement in the extend direction. In that event, as the ram starts to move to the left, piston 81 moves to the right, and piston 91 moves to the left. Rod 52 and chamber 86 are moved to the right to a point where the fluid in chamber 86 and the fluid in passage 104 is ported out passages 102 and to the return line 121. Rod 62 and chamber 96 are moved to the left to a point where the fluid in chamber 96 and the fluid in line 104 is also ported through passage 100 from chamber 96 and then into passage 103 and back to the return line 121. This sudden flow of fluid from pressure passage 104 into the return line causes the mating piston element 115 to drop back to the position shown on the drawing, and causes pressure to be removed from the right end of engage valve spool 180 and it is then forced in the rightward direction by spring 182. After this disengagement has occured, and the spool 180 has moved to the right as shown in the drawing of FIGURE 2B, the extended ram 10 is recentered by spring 16 to the position as shown in FIGURE 2A. This recentering occurs by forcing the fluid out of chambers 20 and 30, through passages 21 and 31, respectfully, through the space between lands 185–186 and 186–187, respectfully, through passages 190 and 191, through flow restricting orifice 192, into passages 193 and 194, through the space between lands 187–188 and 188–189, into passages 23 and 33, and into chambers 22 and 32. Since flow restricting orifice 192 is in this recentering path, a gentle centering of the ram action occurs, to prevent any sudden or abrupt movement of the craft control surface.

After disengagement, with member 115 removed from piston 112 piston 81 remains in the hard-over position to the right due to the continuous signal received in coil 163. Thus, so long as this malfunction exists, chamber 86 connects pressure passage 101 to the return passage 102, and there can be no re-engagement of the servomotor. Thus, it is apparent that the comparator disengage feature just described will prevent re-engagement of the servomotor until the comparator pistons 81 and 91 have returned within the tolerance limits of the system, and this will be indicated by completed circuits through contacts 58–59 and 67–68. Thus, the system may be reengaged following temporary malfunctions.

It should be noted that with the servomotor properly engaged, and the application of a predetermined signal to the servomotor from each of the autopilot channels, ram 10 can be extended to the point where contact 71–73 is closed, and it is therefore convenient to check the proper operation of the engaged system by means of this indication switch.

It is clear from the above discussion, that the applicant's invention provides an electro-hydraulic servomotor which compares two independent electrical input signals and commands the actuator to respond to the average value of the two independent signals. In addition, the applicant's invention is arranged to prevent the operation of the actuator upon malfunction of either of the systems providing the electrical input signals or upon malfunction of the hydraulic portions of the invention. In the event of any of the aforementioned malfunctions, the actuator is gently restored to a neutral position.

It is apparent from the above described mechanization that a hard-over signal, or other serious malfunction in one of the autopilot channels, is effective to disengage the servomotor and autopilot, and in such a manner that there is a slow recentering of the servomotor ram to prevent any abrupt movements of the aircraft. This "failgently" mechanization, which is achieved completely with hydraulics, is especially important in a high-performance aircraft where a very slight abrupt movement of a control surface could cause serious stress of the craft.

What has been described is considered to be the preferred embodiment of our invention, but it is apparent that numerous modifications thereof are possible, and that the concepts involved are not necessarily limited to aircraft applications. Therefore, we do not wish to be limited to the form shown except as indicated by the following claims.

We claim:

1. In a hydraulic servomechanism: a base member; a reversible actuator means; a supply passage; a return passage; engage valve means; control valve means, said engage valve means and said control valve means connecting said supply passage and said return passage to said actuator means; dual comparator rods; means mechanically connecting said comparator rods; each of said rods having an enlarged diameter section thereon forming a comparator piston concentric therewith; dual comparator cylinders, each of said comparator pistons being slideable contained within said comparator cylinders thereby forming dual pairs of comparator chambers; said dual comparator rods each having a reduced diameter section thereon spaced from said comparator piston and cooperating with said base member to form an annular chamber; means connecting each said annular chamber with said supply passage and said return passage thereby forming dual comparator disengage valves; said control valve means connecting said supply passage and said return passage to said comparator chambers, said comparator pistons being operable in response to the fluid flow rate of said control valve means, said comparator disengage valves being operable in response to a predetermined displacement of said comparator pistons; switching means operable in response to said said predetermined displacement of said comparator pistons, and dual feedback means, said feedback means producing signals indicative of the displacement of said actuator means.

2. In a hydraulic servomechanism: a base member; dual comparator rods; means mechanically connecting said comparator rods; each of said dual rods having an enlarged diameter section thereon forming a comparator piston concentric therewith; dual comparator cylinders, each of said comparator pistons being slideably contained within one of said comparator cylinders thereby forming dual pairs of comparator chambers; each of said dual comparator rods having a reduced diameter section thereon spaced from said comparator piston and cooperating with said base member to form an annular chamber; a supply passage; a return passage; means connecting each said annular chamber with said supply passage and said return passage thereby forming dual comparator disengage valves; control valve means connecting said comparator chamber with said supply passage and said return passage, said comparator pistons being displaced in response to the flow rate of said control valve means; said comparator disengage valves being operable in response to a predetermined displacement of said comparator rods; switching means, said switching means being operable in response to said predetermined displacement of said comparator rods; dual feedback means, said feedback means operable at least in part by the displacement of said comparator rods.

3. In a dual hydraulic servomechanism: actuator means; a first pair of hydraulic chambers controlling movement of said actuator in the extend direction; a second pair of hydraulic chambers controlling movement in the retract direction; engage valve means; control means, said engage valve means and said control means connecting said hydraulic chambers to a supply passage and a return passage; comparator means, said control means connecting said supply passage and said return passage to said comparator means, said comparator means comprising dual comparator shaft means and means connecting said comparator shaft means, said control means operable in response to a plurality of input signals, said comparator shaft means reacting to the flow rate of said control means whereby said comparator means compares said input signals and said actuator means is displaced an amount proportional thereto; comparator disengage means operable in response to a predetermined displacement of said comparator shaft means; and switching means operable in response to said predetermined displacement of said comparator shaft means.

4. In a hydraulic servomechanism: an actuator means comprising a first plurality of fluid chambers controlling movement of said actuator in the extend direction and a second plurality of fluid chambers controlling movement in the retract direction; engage valve means; control means, said engage valve means and said control means connecting a supply passage and a return passage to said fluid chambers; comparator means, said control valve means connecting said supply passage and said return passage to said comparator means, said comparator means comprising a plurality of comparator shaft means and means connecting said comparator shaft means, said comparator shaft means being displaced in response to the flow rate of said control valve means; comparator disengage valve means operable in response to a predetermined displacement of said comparator shaft means; and switching means operable in response to said predetermined displacement of said comparator shaft means.

5. In a hydraulic servomechanism: an actuator means, said actuator means comprising a plurality of fluid chambers, at least two of said fluid chambers controlling movement of said actuator in one direction, and at least two of said fluid chambers controlling movement in the opposite direction; engage valve means; control valve means, said engage valve means and said control valve means connecting a supply passage and a return passage to said fluid chambers; comparator means, said control valve means connecting said supply passage and said return passage to said comparator means, said comparator means comprising at least two comparator shaft means and means connecting said comparator shaft means, said comparator shaft means being displaced in response to the flow rate of said control valve means; comparator disengage valve means operable in response to a predetermined displacement of said comparator shaft means; and switching means operable in response to said predetermined displacement of said comparator shaft means.

6. In a hydraulic servomechanism: an actuator means, said actuator means comprising a plurality of fluid chambers; engage valve means; control valve means, said engage valve and said control valve means connecting a supply passage and a return passage to said fluid chambers; comparator means, said control valve means connecting said supply passage and said return passage to said comparator means, said comparator means comprising a plurality of comparator shaft means and means connecting said comparator shaft means, said comparator shaft means being operable in response to the flow rate of said control valve means; comparator disengage valve means operable in response to a predetermined displacement of said comparator shaft means; and switching means operable in response to a predetermined displacement of said comparator shaft means.

7. In an electro-hydraulic servomechanism: a base member; an actuator means; a supply passage; a return passage; an engage valve; a plurality of control valves, said control valves and said engage valve connecting said actuator means to said supply passage and said return passage; comparator means, said comparator means comprising a first comparator shaft means, a second comparator shaft means, and means connecting said first and said second comparator shaft means; a first and a second comparator disengage valve; switching means; said control valves connecting said first comparator shaft means and said second comparator shaft means to said supply passage and said return passage; feedback means, said control valves operable in response to a plurality of input signals, said comparator means comparing said input signals whereby said actuator means is displaced relative to said base member an amount proportional thereto, said feedback means producing signals indicative of the displacement of said actuator, said first and said second disengage valve being operable in response to predetermined input signals, and said switching means being operable in response to predetermined input signals.

8. In an electro-hydraulic servomechanism: a base member; an actuator means; a supply passage; a return passage; an engage valve; a plurality of control valves, said control valves and said engage valve connecting said actuator means to said supply passage and said return passage; comparator means, said comparator means comprising a plurality of comparator shaft means and means connecting said comparator shaft means; a plurality of comparator disengage valves; switching means, said control valves connecting said comparator shaft means to said supply passage and said return passage; feedback means, said control valves operable in response to a plurality of input signals, said comparator means functioning to compare said input signals whereby said actuator means is displaced relative to said base member an amount proportional thereto, said feedback means producing a signal indicative of the displacement of said actuator, said comparator disengage valves being operable in response to predetermined input signals, and said switching means being operable in response to predetermined input signals.

9. In an electro-hydraulic servomechanism: a base member; an actuator means; a supply passage; a return passage; an engage valve; a plurality of control valves, said control valves and said engage valve connecting said actuator means to said supply passage and said return passage; comparator means, said comparator means comprising a first comparator shaft means, a second comparator shaft means, and means connecting said first and said second comparator shaft means, said control valves connecting said first comparator shaft means and said second comparator means to said supply passage and said return passage; feedback means, said control valves operable in response to a plurality of input signals, said comparator means functioning to compare said input signals whereby said actuator means is displaced relative to said base member an amount proportional thereto, said feedback means producing signals indicative of the displacement of said actuator.

10. In an electro-hydraulic servomechanism: a base member; an actuator means: a supply passage; a return passage; an engage valve; a plurality of control valves, said control valves and said engage valve connecting said actuator means to said supply passage and said return passage; comparator means, said comparator means comprising a plurality of comparator shaft means and means connecting said comparator shaft means, said control valves connecting said comparator shaft means to said supply passage and said return passage; feedback means, said control valves operable in response to a plurality of input signals, said comparator means functioning to compare said input signals whereby said actuator means is displaced relative to said base member an amount proportional thereto, said feedback means producing signals indicative of the displacement of said actuator.

11. In an electro-hydraulic servomechanism: a base member; an actuator means; a supply passage; a return passage; a plurality of control valves, said control valves connecting said actuator means to said supply passage and said return passage; and comparator means, said comparator means comprising a plurality of comparator shaft means and means connecting said comparator shaft means, said control valves connecting said comparator shaft means to said supply passage and said return passage, said control valves being operable in response to a plurality of input signals, and said comparator means functioning to compare said input signals whereby said actuator means is displaced relative to said base member an amount indicative of the average of said input signals.

12. In an electro-hydraulic servomechanism: a supply passage; a return passage; a plurality of control valves; and comparator means, said comparator means comprising a plurality of comparator shaft means and means connecting said comparator shaft means, said control valves connecting said comparator shaft means to supply passage and said return passage, said comparator shaft means being operable in response to the flow rate of said control valves, said control valves being operable in response to a plurality of input signals, and said comparator means functioning to compare said input signals whereby said servomotor provides an output signal indicative of the average of said input signals.

13. In an electrohydraulic servomotor having two piston means movable in response to control signals from a plurality of control valves which connect said piston means to a supply passage and a return passage and are operable in response to a plurality of electrical input signals and follow up signals, in combination with comparator means for comparing said plurality of input signals and causing said servomotor to be displaced an amount indicative of the average of said plurality of input signals.

14. In an electrohydraluic servomotor having two members movable in response to control signals from a plurality of control valves which connect said members to a supply passage and a return passage and are operable in response to a plurality of electrical signals, in combination with comparator means for comparing said plurality of electrical signals and causing said servomotor to be displaced an amount indicative of the average of said plurality of electrical signals.

15. In a servomotor system having two output member portions, each output member portion having control means, each output member portion comprising a portion of a separate servomechanism loop wherein the operation of the output member portion is in accordance with the magnitude of an input signal: a first source of initiating signal for a first servomechanism loop; a second source of initiating signal for a second servo- mechanism loop system; a separate feedback means for each servomechanism loop operated in part by said output member portions, each servomechanism loop determining the operation of each output member portion therein; and comparator means connected to both feedback means for modifying the operation of each feedback means, said comparator means being in turn oppositely controlled by both control means in accordance with the existing operating state of both output member portions, whereby additional operation in the same direction as that caused by its initiating signal is given to the output member portion having the smaller initiating signal.

16. In a servomotor system having two output member portions, one output member portion comprising a portion of a first servomechanism loop, the other output member portion comprising a portion of another servomechanism loop, each servomechanism loop having a separate control means initiating operation of each servomechanism loop and a separate feedback means providing an effect determining the operation of each servomechanism loop comprising: comparator means connected to both feedback means for modifying the operation determining effect of each feedback means, said comparator means being oppositely controlled by both control means in accordance with the operation of both output member portions, whereby additional operation in the same direction as that caused by its initiating signal is given to the output member portion having the smaller initiating signal because of the modification in servomechanism operation determining effect of the feedback means.

17. A servomotor system having two output member portions, one output member portion comprising a portion of a first servomechanism loop, the other output member portion comprising a portion of a second servomechanism loop, a first means in said first control servomechanism initiating operation of said first servomechanism, a second control means in said second servomechanism initiating operation of said second servomechanism, first feedback means operated in part by said first output member portion terminating the operation of said first output member portion, second feedback means operated in part by said second output member portion terminating the operation of said second output member portion, and comparator means connected to both followup means for modifying the operation of each of said first and second feedback means, said comparator means being oppositely controlled by both said first and second control means during operation of said two output member portions whereby additional operation in the same direction as that caused by its initiating signal is given to the output member portion having the smaller initiating signal.

References Cited in the file of this patent
UNITED STATES PATENTS

| | | |
|---|---|---|
| 1,683,175 | Falcke et al. | Sept. 4, 1928 |
| 2,832,317 | Henry | Apr. 29, 1958 |
| 2,898,889 | Foster | Aug. 11, 1959 |
| 2,947,285 | Baltus et al. | Aug. 2, 1960 |
| 2,950,703 | Fletcher et al. | Aug. 30, 1960 |
| 2,969,773 | Henry | Jan. 31, 1961 |
| 3,017,865 | Franz et al. | Jan. 23, 1962 |
| 3,027,878 | Keyt et al. | Apr. 3, 1962 |